United States Patent
Pau et al.

(10) Patent No.: US 12,050,331 B2
(45) Date of Patent: Jul. 30, 2024

(54) FABRICATION, DESIGN AND APPLICATION OF HIGH RESOLUTION PATTERNED POLARIZATION FILTER

(71) Applicant: Arizona Board of Regents on Behalf of the University of Arizona, Tucson, AZ (US)

(72) Inventors: Stanley Pau, Tucson, AZ (US); Xingzhou Tu, Tucson, AZ (US)

(73) Assignee: The Arizona Board of Regents on behalf of he University of Arizona, Tucson, AZ (US)

(*) Notice: Subject to any disclaimer, the term of this patent is extended or adjusted under 35 U.S.C. 154(b) by 56 days.

(21) Appl. No.: 17/905,152

(22) PCT Filed: Feb. 26, 2021

(86) PCT No.: PCT/US2021/020082
§ 371 (c)(1),
(2) Date: Aug. 26, 2022

(87) PCT Pub. No.: WO2021/174119
PCT Pub. Date: Sep. 2, 2021

(65) Prior Publication Data
US 2023/0152503 A1   May 18, 2023

Related U.S. Application Data

(60) Provisional application No. 62/983,431, filed on Feb. 28, 2020.

(51) Int. Cl.
G02B 5/30 (2006.01)

(52) U.S. Cl.
CPC ......... *G02B 5/3016* (2013.01); *G02B 5/3083* (2013.01)

(58) Field of Classification Search
CPC ... G02B 5/3016; G02B 5/3058; G02B 5/3083
See application file for complete search history.

(56) References Cited

U.S. PATENT DOCUMENTS

| | | |
|---|---|---|
| 2002/0113921 A1 | 8/2002 | Jiang et al. |
| 2006/0050273 A1 | 3/2006 | Chinnock et al. |
| 2015/0301249 A1* | 10/2015 | Pau ............ C09K 19/56 349/124 |
| 2016/0170110 A1 | 6/2016 | Pau et al. |
| 2018/0180486 A1* | 6/2018 | Pau ............ H04N 5/33 |

OTHER PUBLICATIONS

International Search Report and Written Opinion dated May 7, 2021, from International Patent Application No. PCT/US2021/020082, 10 pp.

Tu et al. "Design, fabrication and testing of achromatic elliptical polarizer," Optics Express, 25(9): 10355-10367 (May 2017).

* cited by examiner

*Primary Examiner* — Alexander P Gross
(74) *Attorney, Agent, or Firm* — Klarquist Sparkman, LLP

(57) ABSTRACT

Patterned polarizers with reduced transition regions are formed using a directional etch. Multiple layers can be combined to produce filters for polarization cameras and displays as well as achromatic filters.

16 Claims, 17 Drawing Sheets

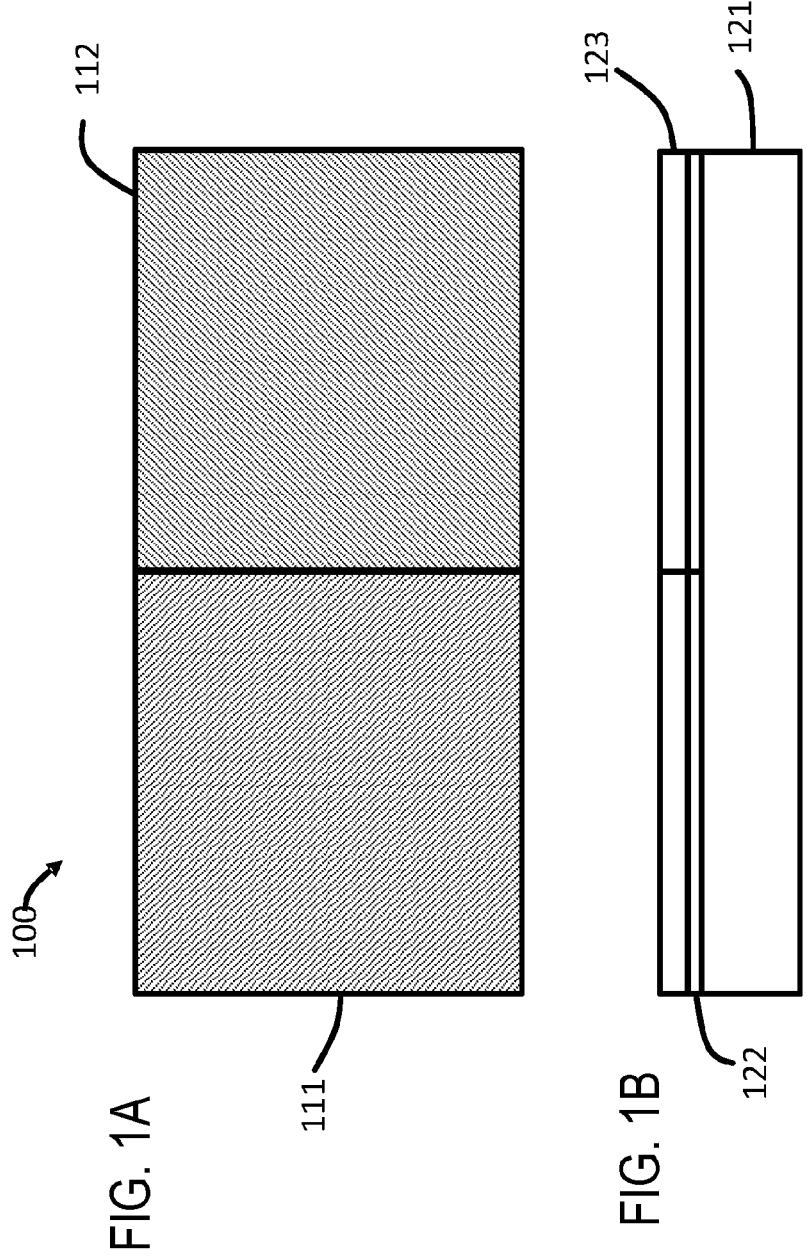

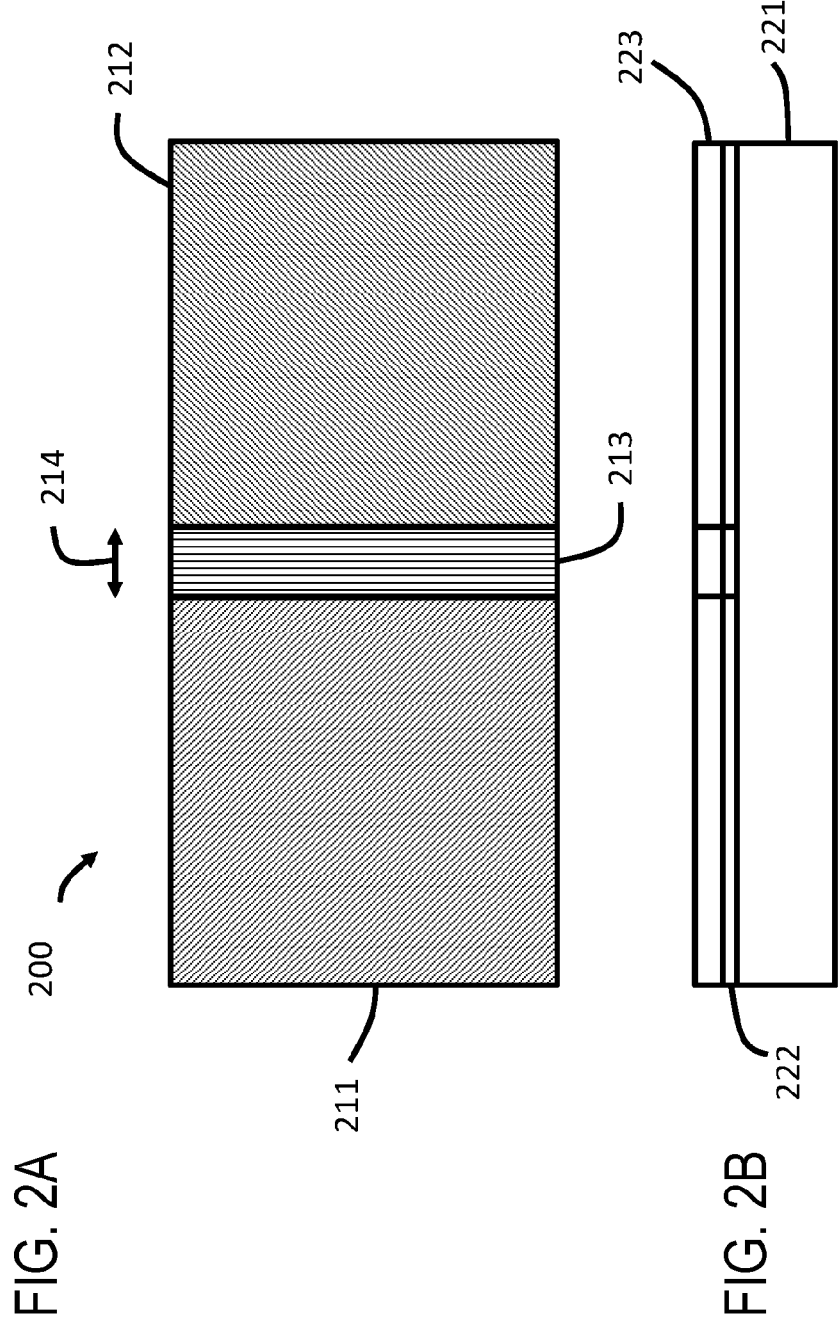

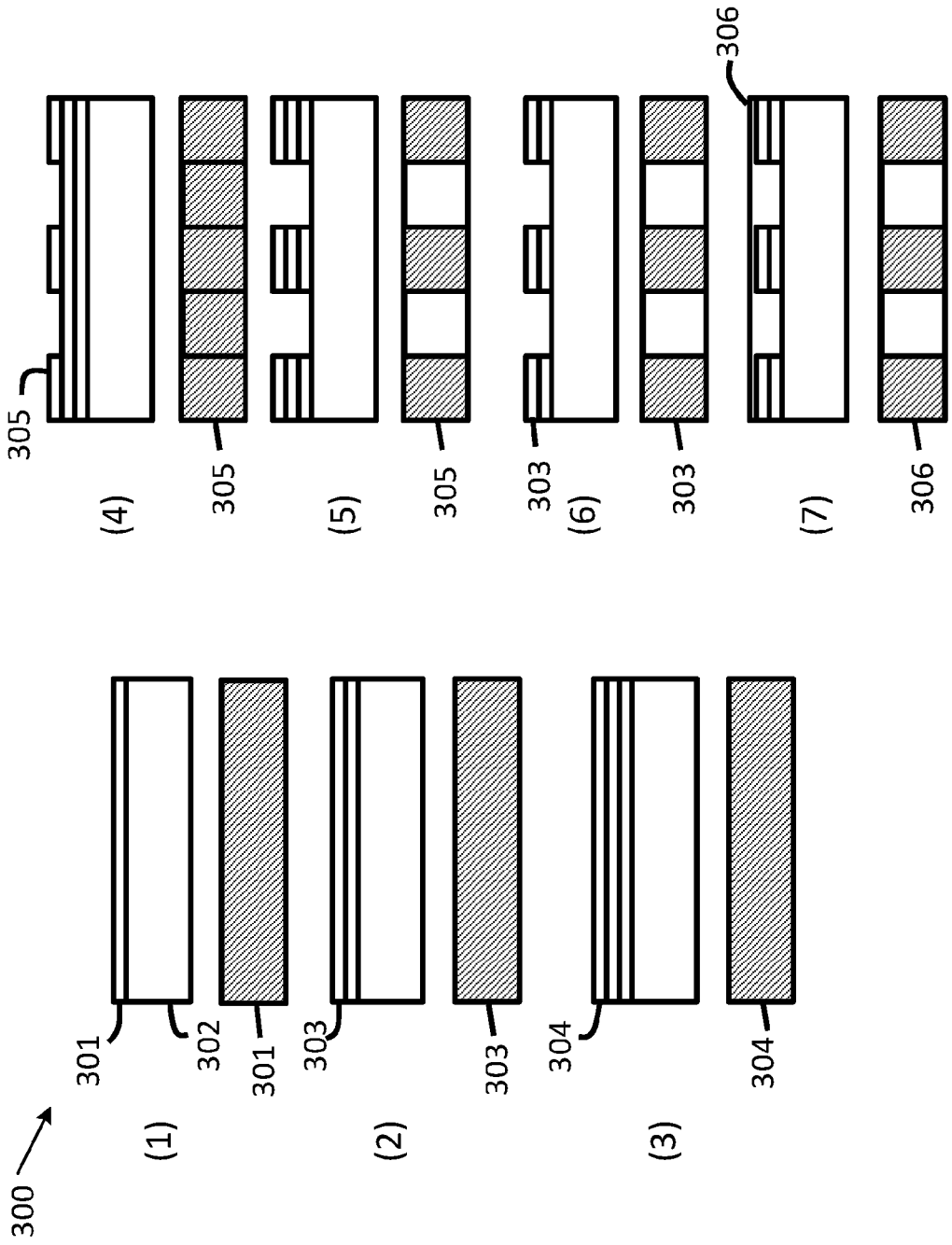

FABRICATION, DESIGN AND APPLICATION OF HIGH RESOLUTION PATTERNED POLARIZATION FILTER

CROSS REFERENCE TO RELATED APPLICATIONS

This is the U.S. National Stage of International Application No. PCT/US2021/020082, filed Feb. 26, 2021, which was published in English under PCT Article 21(2), which in turn claims the benefit of U.S. Provisional Application No. 62/983,431, filed Feb. 28, 2020. The provisional application is incorporated herein in its entirety.

FIELD

The disclosure pertains to patterned or pixelated polarizers and polarization based displays and light sources.

BACKGROUND

Patterned polarizers, especially those suitable for use with sensor arrays, can exhibit variable polarization effects, especially at transition regions in which polarizer pixel alignment direction changes. This is especially problematic for polarizer elements with dimensions of about 1 µm or less that are needed for use with high resolution image sensors. Approaches for producing patterned polarizers with reduced transition regions are needed.

SUMMARY

Methods of fabricating a patterned polarizing filters comprise forming a first aligned liquid crystal polymer layer and directionally etching the first aligned liquid crystal polarization layer to produce a plurality of filter pixels, wherein at least a first one of the pixels includes a first portion of the first aligned liquid crystal polarization layer. In some examples, a first alignment layer is formed on a substrate and a first liquid crystal layer is deposited on the first alignment layer to form the first aligned liquid crystal polymer layer. In other examples, methods include forming a first alignment layer on a substrate, depositing a first liquid crystal layer on the first alignment layer to form the first aligned liquid crystal polymer layer; forming a barrier layer on the first aligned LCP layer; forming a second alignment layer on the first aligned LCP layer; and depositing a second liquid crystal layer on the first alignment layer to form a second aligned LCP layer. In further examples, the methods can include directionally etching at least the first aligned LCP layer and the second LCP layer to produce the plurality of filter pixels, wherein at least the first one of the plurality of polarizer pixels includes the first portion of the first aligned liquid crystal polarization layer and a first portion of the second LCP layer and at least a second one pixel includes a second portion of the first aligned LCP layer.

Pixelated polarizers comprise a plurality of first pixels defined by a first LCP and a first alignment layer having a first alignment, a second plurality of pixels defined by the first LCP and the first alignment layer and a second LCP and a second alignment layer have a second alignment that is different from the first all; and a third plurality of pixels lacking the first and second LCP and alignment layers. In some examples, a planarization layer is situated on the first, second, and third plurality of pixels.

Sensors include a plurality of sensor elements and a substrate having a plurality of substrate polarizer pixels corresponding to one of the plurality of sensor elements, the plurality of substrate polarizer pixels including substrate polarizer pixels having at least two orientations; and a pixelated polarizer as described above and situated so that the first, second, third pluralities of pixels and the plurality of substrate polarizer pixels are aligned.

Polarization displays include a plurality of light emitter elements and a substrate having a plurality of substrate polarizer pixels corresponding the plurality of light emitter elements, the plurality of substrate polarizer pixels including substrate polarizer pixels having at least two orientations; and a pixelated polarizer as described above and situated so that the first, second, third pluralities of pixels and the plurality of substrate polarizer pixels are aligned.

A computer implemented method comprises selecting a range of LCP layers and a set of available LCPs for use in the layers; selecting a constraint, and with a processor, determining at least one number of LCP layers and LCPs associated with the constraint, wherein the constrain can be analyzer vector variation (AVV) or equally weighted variance (EWV) values or minimization.

BRIEF DESCRIPTION OF THE DRAWINGS

FIGS. 1A-1B illustrate a plan view and a sectional view of a representative patterned polarizer.

FIGS. 2A-2B illustrate a plan view and a sectional view of a representative patterned polarizer and a transition region between polarizer regions.

FIG. 3 illustrates a representative method for making patterned polarizers.

DETAILED DESCRIPTION

Introduction

Figure 2C:
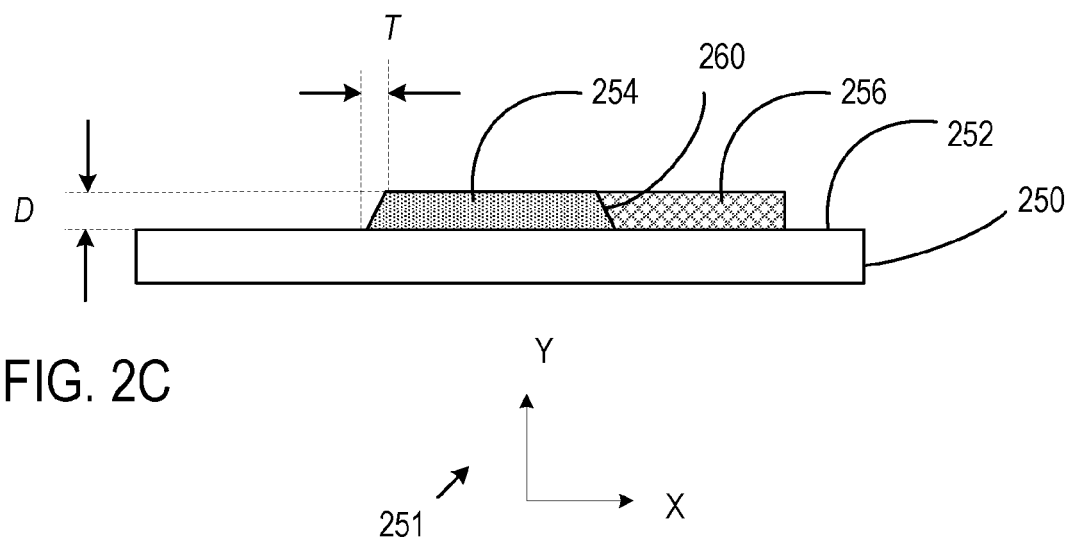
FIG. 2C illustrates a transition region between pixel elements.

The disclosure pertains to methods of fabricating polarization filters, such as pixelated polarization filters, for applications to displays and sensors, and polarizers such as those fabricated according to the disclosed approaches along with apparatus that use these pixelated optical devices. These methods can be used to fabricate pixelated arrays of polarization filters on top of sensor arrays, such as CMOS or CCD arrays. The sensor array can be part of a polarization camera that can measure polarization images. Several achromatic polarization filters are also disclosed. The pixelated arrays of polarization filters can also be put on top of arrays of light sources, such as organic light emitting diodes or liquid crystal light panels, to form, for example, a polarization display which can display an image of arbitrary polarization states.

Some prior approaches to polarization devices can be found in U.S. Pat. Nos. 8,866,997, 10,254,453, 9,886,559, 7,790,231, 8,823,848 all of which are incorporated herein by reference. Additional information can be found in Tu et al., "Design, fabrication and testing of achromatic elliptical polarizer," Optics Express 25, 10355, 2017, Tu and Pau, "Optimized design of N optical filters for color and polarization imaging," Optics Express 24, 3011, 2016, both of which are incorporated herein by reference.

In the examples, particular orientations of fast and slow axes and eigenpolarizations are used, but these are for purposes of illustration, and arbitrary arrangements are possible. In the examples, wire grid polarizers are used, but other types of neutral polarizers could be used instead.

The disclosure generally pertains to polarizers, pixelated polarizers and waveplates, and methods for making such polarizers. In some disclosed approaches, transition regions between adjacent polarizer elements, and/or one or more of the associated liquid crystal polymer layer and the photo-orientable polymer network alignment layer are reduced by fabricating using a directional etch. In these transition regions pixel properties associated with a first polarizer or waveplate pixel transition to the pixel properties of an adjacent polarizer or waveplate pixel. Properties such as polarizer axis direction, waveplate axis direction or retardance, birefringence, spectral transmittance, transmittance, or other optical property associated with propagation in isotropic or anisotropic media can vary. Using a direction etch permits superior edge definition and any scattering at pixel edges can be reduced using isotropic materials to fill gaps between pixels or by defining pixels to cover a substrate surface. Alignment of liquid crystal polymer (LCP) layers is generally establish by patterning a photo-orientable polymer network (PPN) as discussed below. Polarizer pixel boundaries are established with directional etching that can provide edge transition regions between pixels that are less than 1/10, 1/20, or less of a layer thickness. One representative directional etch is a plasma etch as described generally in the following table. Etch conditions for etching through a mask layer (referred to as a hard mask) of $SiO_2$ of thickness of about 50 nm and etching through an LCP layer of between 3-5 µm are given in the following table for a particular etching system. Thicker or thinner layers can be similarly etched with longer or shorter etch times and exact conditions. In this example $SiO_2$ is etched with an inductively coupled plasma (ICP) etcher in a $CHF_3$ atmosphere followed by reactive ion etching (RIE) in an oxygen atmosphere. LCP layers are etched with an ICP etch in a $CHF_3$: atmosphere followed by RIE etching in an argon atmosphere.

| Material | Gas Flow Rate (sccm) | Pressure (mT) | ICP Power (W) | RIE Power (W) | Etch Time (s) |
|---|---|---|---|---|---|
| $SiO_2$ | $CHF_3$: 50 $O_2$: 5 | 5 | 400 | 100 | 75 |
| LCP | $CHF_3$: 50 Ar: 5 | 5 | 500 | 59 | 345 |

Polarization filters such as optical polarizer and wave plates are anisotropic devices that have optical properties that are directionally dependent. The direction or orientation of the filters is commonly defined relative to a crystallographic axis such as the optical axis or fast and slow axis of the material. For many applications, there is a need to create array of polarization filters with well-defined shape and orientation. FIGS. 1A-1B show a polarization filter 100 which is made of a substrate 121, an alignment layer 122 and a liquid crystal polymer (LCP) layer 123. The alignment layer 122 can be a layer of photo-orientable polymer network (PPN) such as those made by Rolic Technologies Ltd., Allschwill, Switzerland, and the LCP can be reactive mesogen RMM141C made by EMD Performance Materials, part of Merck KGaA, Darmstadt, Germany or other LCP. The PPN is exposed with linear polarized ultraviolet (UV) light to create an alignment layer that has different orientations. For example, a region 111 can have an alignment at 135 degrees, and region 112 can have an alignment at 45 degrees. The LCP layer 123 typically follows the alignment of the PPN layer 122. In some materials, the LCP layer has the same alignment angle as the PPN layer. In other materials, the LCP has the same alignment angle as the PPN layer plus an offset angle. An example of an offset angle is 90 degrees. In this case, the LCP layer is aligned perpendicularly to the PPN layer.

Ideally, LCP layer alignment follows the angle of the PPN layer, and the offset angle is constant. In practice, there is a transition region between regions of one alignment angle and an adjacent region of an alternate alignment angle. FIGS. 2A-2B show a polarization filter 200 which is made of a substrate 221, an alignment layer 222 and a LCP layer 223. Region 211 has an alignment at 135 degrees, and region 212 has an alignment at 45 degrees. At the boundary between the regions 211 and 212, there is a transition region 213 with dimension 214. The transition region 213 has a spatially varying alignment angle and an average alignment angle of 90 degrees, which is the average of 45 degrees and 135 degrees. The exact value of the transition region 214 depends on the type of LCP and PPN, the processing conditions and the thickness of the layers. In practice, this can range from 0.5 to 5 µm and limits the spatial resolution of the patterns in the polarization filter. The width of the transition generally increases with increasing thickness of the LCP layer.

For existing CMOS and CCD optical sensor arrays, the size of the pixel can be of the order of 1 µm or smaller. There is a need to create patterned polarization filter that has the same dimension and shape as the pixel. This disclosure pertains to the fabrication techniques discussed below that can reduce and/or remove the transition regions as well as polarization devices produced by such methods. In addition, designs of achromatic optical filters that can be fabricated by this or other techniques are provided.

FIG. 2C illustrates a substrate 250 having a major surface 252 on which pixel elements 254, 256 are situated. The pixel elements 254, 256 can be pixel polarizers, waveplates, isotropic filters, window or neutral materials, or have other optical properties. For convenience, the pixel elements are shown as single layers, but one or both can comprise multiple layers. A transition region 260 (or an edge of either of the pixel elements 254, 256) extends a length T along the major surface 252 (an X-direction in the coordinate system 251) and the pixel elements have thickness D in a Y-direction perpendicular to the major surface 252. Using directional etches as disclosed herein, a ratio T/D can be less than ⅓, ¼, ⅕, 1/10, 1/20 or less.

FIG. 3 (3.1-3.7) illustrate a process flow 300 to fabricate a patterned polarization filter. The process flow 300 has seven steps. For each step, the cross-sectional view is shown at top, and the top view is shown at the bottom. The dense parallel lines in the top view denote the alignment direction of the optical device. All views are for illustrative purpose and not drawn to scale. In step 1, a layer of alignment material 301 is coated on a substrate 302. The alignment material 301 can be the aforementioned PPN with alignment direction defined by polarized UV light. Alternatively, the alignment material 301 can be a layer of polyimide with alignment direction defined by mechanical rubbing, or a directionally evaporated layer. As shown in the top view of the filter 310, the alignment direction is 135 degrees. In step 2, a layer of LCP 303 is coated on top of the alignment material 301. The LCP layer 303 generally has the same alignment direction as the alignment material 301 but may have an offset as well. In step 3, a photoresist 304 is coated on top of the LCP layer 303. In step 4, the photoresist is exposed to a pattern of UV light and subsequently developed. The lithographic process can be done by a maskless lithography system or a mask based system, such as a contact printer. In step 5, the LCP and alignment layer are patterned by etching. Regions of LCP that are covered by photoresist are protected and therefore are not etched. The photoresist is removed in step 6. In step 7, a planarization layer 306 is coated on top of the patterned LCP. The purpose of the planarization layer is to protect the LCP and to create a flat surface for subsequent processing. The planarization material should have low optical loss at the operating wavelength, and examples of planarization material and processes are given in patents by Brewer Science. Multiple layer of LCP can be fabricated by repeating the process. In addition, the LCP material in the process can be doped with absorbing dyes or other molecules that have anisotropic emission and absorption. The optical filter can be combined with other optical filters, such as color filters and wire grid polarizers. The LCP materials can be nematic phase formulation, cholesteric phase formulation and C-plate formulation.

Figure 4A:
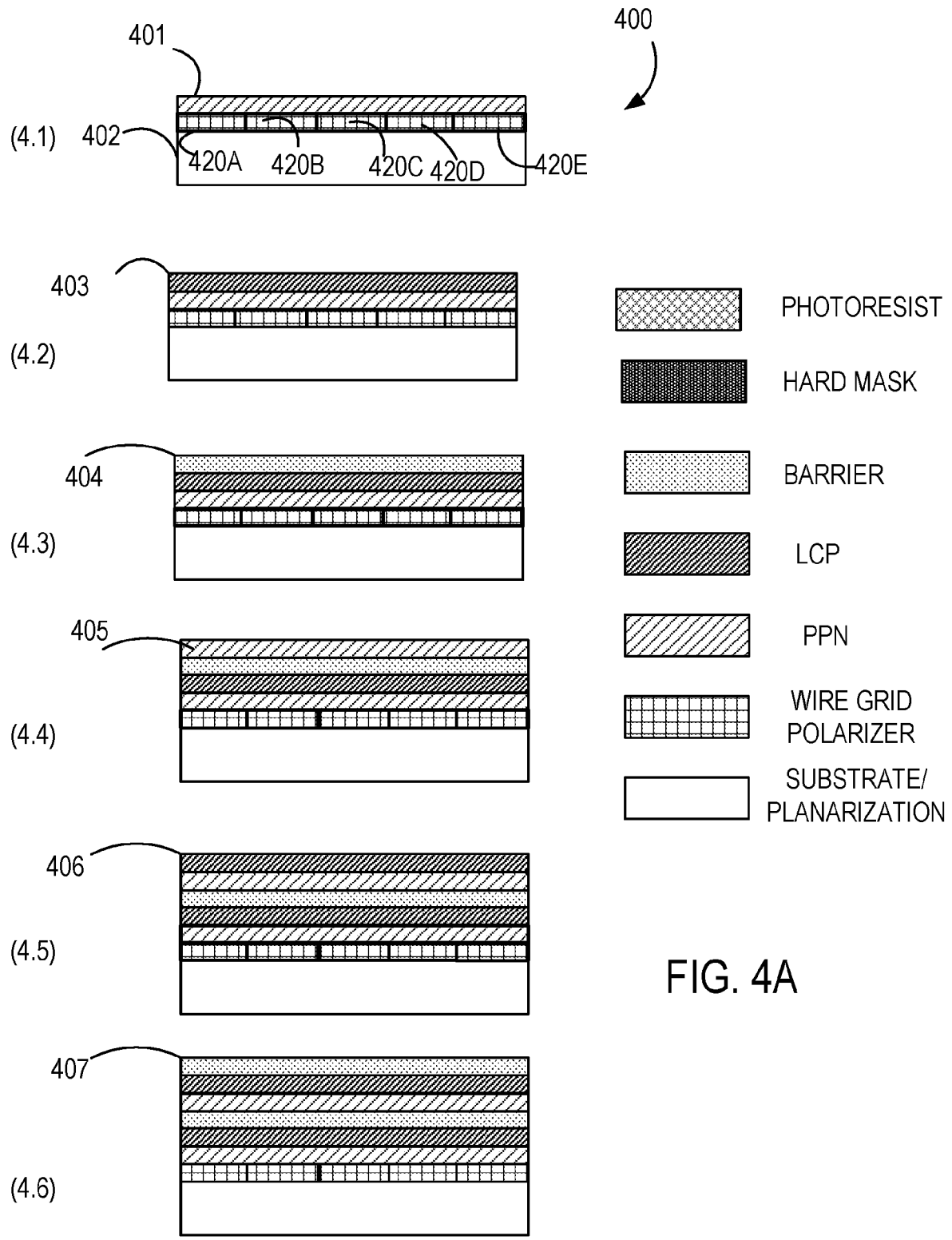
FIGS. 4A-4B illustrate another representative method for making patterned polarizers.
Figure 4B:
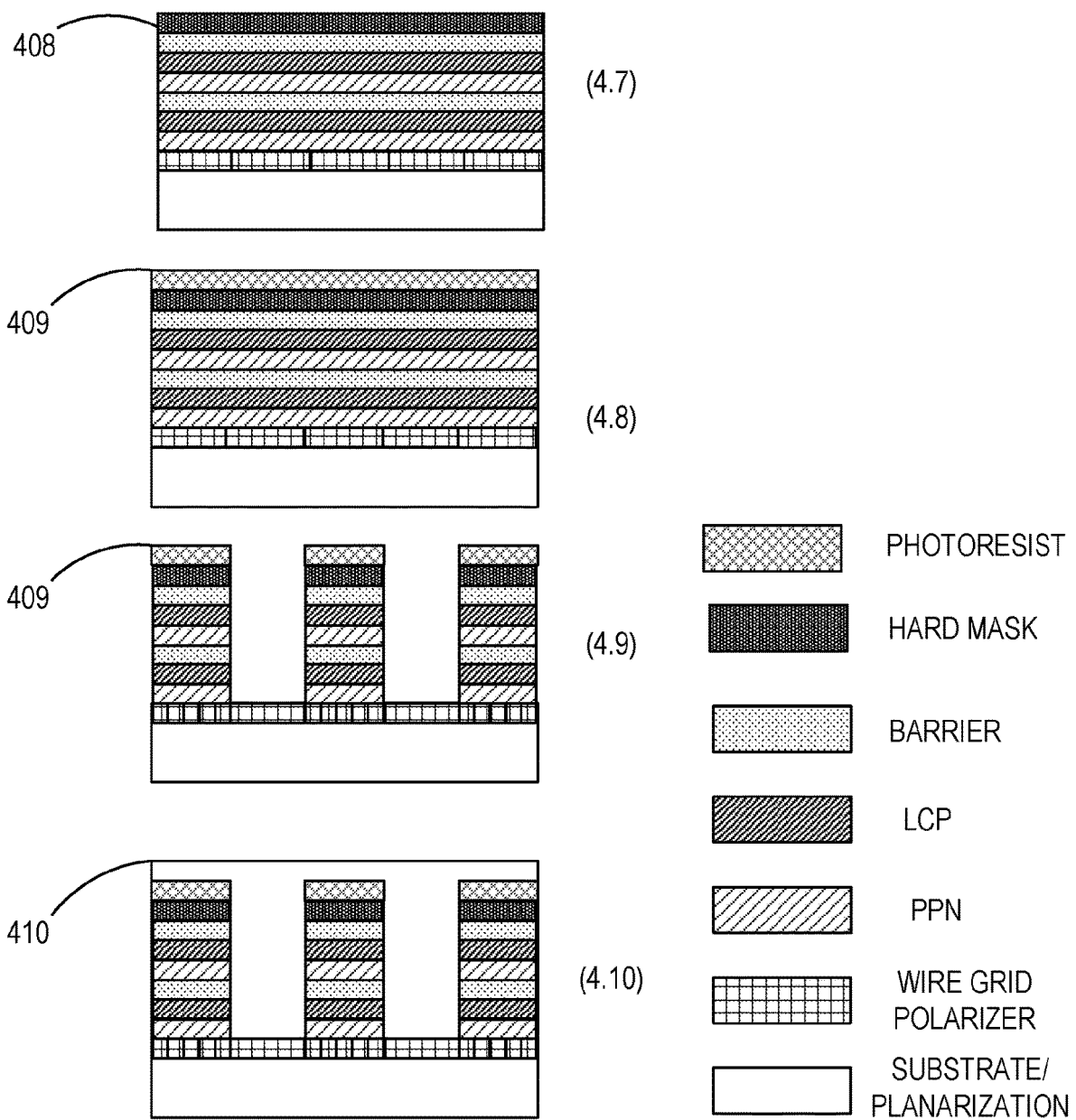
Figure 10:
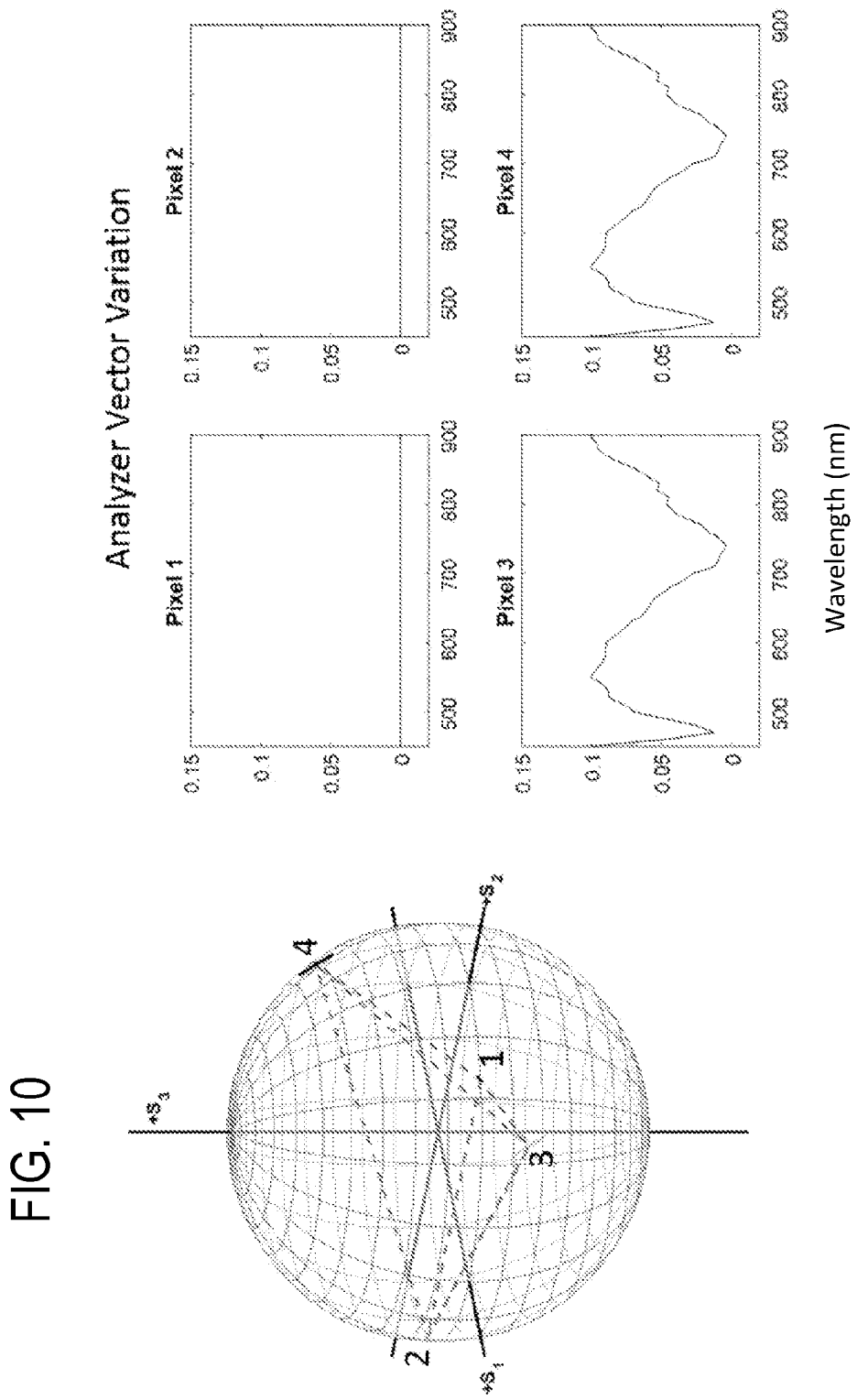
FIG. 10 includes graphs of analyzer vector variation for each of the pixels of Design 3 and their representation on the Poincaré sphere.

FIGS. 4A-4B (4.1-4.10) illustrate another embodiment of a process flow 400 to fabricate a patterned polarization filter. The process flow has ten steps. Only the cross-sectional views are shown in this case. In step 1, a layer of alignment material 401 is coated on a substrate 402 having wire grid polarizers regions 420A-420E of arbitrary orientation. The alignment material 401 can be the aforementioned PPN with alignment direction defined by polarized UV light. Alternatively, the alignment material 401 can be a layer of polyimide with alignment direction defined by mechanical rubbing. In step 2, a layer of LCP 403 is coated on top of the alignment material 401. The LCP layer 403 has the same alignment direction as the alignment material 401. In step 3, a barrier layer or planarization layer 404 is coated on top of the LCP layer 403. In step 4, a layer of alignment material 405 is coated on top of the barrier layer 404. In step 5, a layer of LCP 406 is coated on top of the alignment material 405. The LCP layer 406 has the same alignment direction as the alignment material 405. In step 6, barrier layer or planarization layer 407 is coated on top of the LCP layer 406. In step 7, a dielectric or metallic layer 408 is coated on top of the layer 407. The layer 408 serves as a hard mask for patterning the layers below. In step 8, a photoresist 409 is coated on top of the hard mask layer 408. In step 9, the photoresist is exposed to a pattern of UV light and subsequently developed. The lithographic process can be done by a maskless lithography system or a mask based system, such as a contact printer. The hard mask, LCP and alignment layer are subsequently patterned by etching. Regions of LCP that are covered by photoresist and hard mask are protected and therefore are not etched. The photoresist and hard mask are then removed. In a step shown in FIG. 10, a planarization layer 410 is coated on top.

Figure 5:
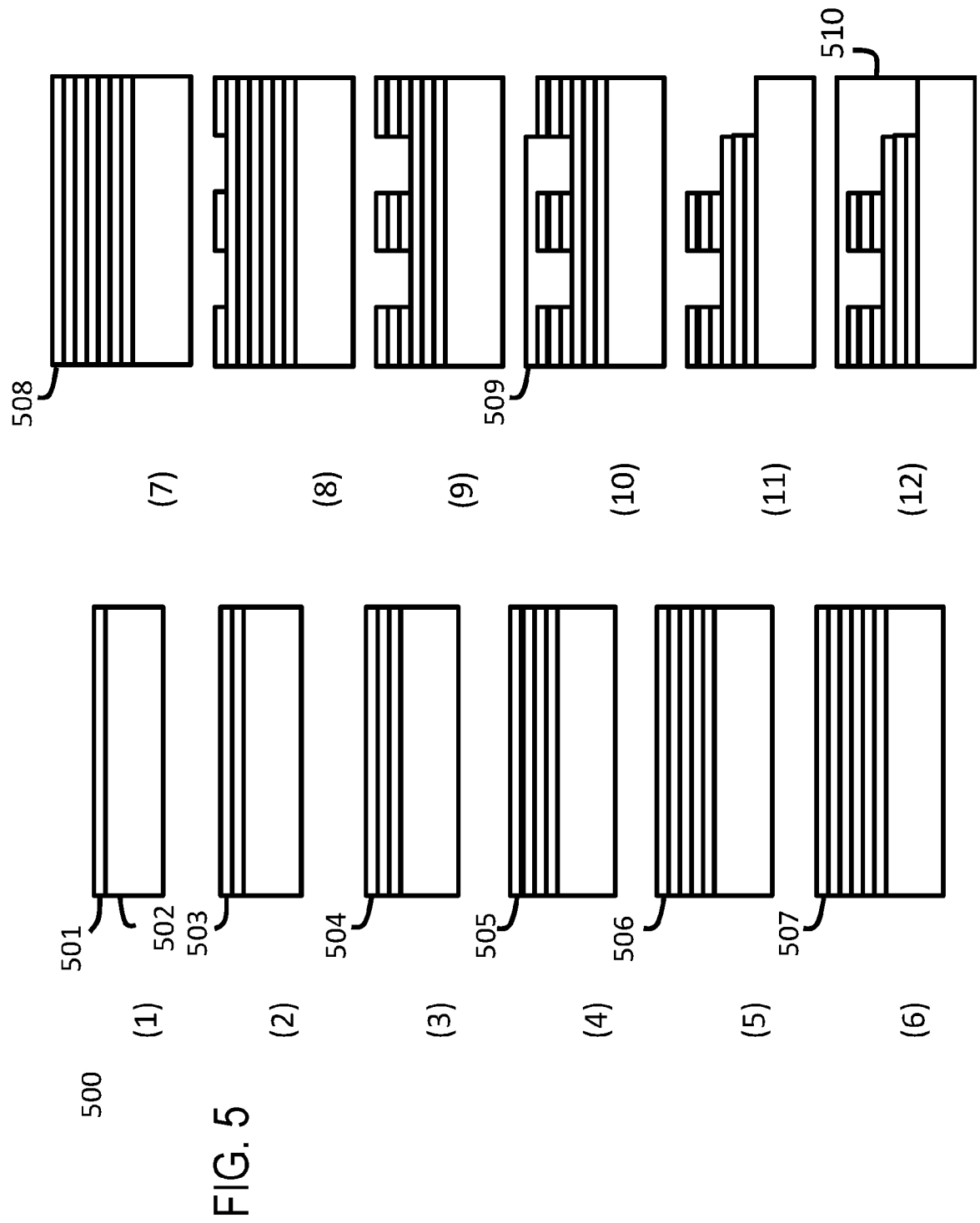
FIG. 5 illustrate another representative method for making patterned polarizers.

FIG. 5 (5.1-5.12) illustrate yet another embodiment of a process flow 500 to fabricate a patterned polarization filter. The process flow has twelve steps. Only the cross-sectional views are shown in this case. In step 1, a layer of alignment material 501 is coated on a substrate 502. The alignment material 501 can be the aforementioned PPN with alignment direction defined by polarized UV light. Alternatively, the alignment material 501 can be a layer of polyimide with alignment direction defined by mechanical rubbing. In step 2, a layer of LCP 503 is coated on top of the alignment material 501. The LCP layer 503 has the same alignment direction as the alignment material 501. In step 3, a barrier layer or planarization layer 504 is coated on top of the LCP layer 503. In step 4, a layer of alignment material 505 is coated on top of the barrier layer 504. In step 5, a layer of LCP 506 is coated on top of the alignment material 505. The LCP layer 506 has the same alignment direction as the alignment material 505. In step 6, barrier layer or planarization layer 507 is coated on top of the LCP layer 506. In step 7, a photoresist 508 is coated on top of the barrier layer 507. In step 8, the photoresist is exposed to a pattern of UV light and subsequently developed. The lithographic process can be done by a maskless lithography system or a mask based system, such as a contact printer. The sample is subsequently etched, and the photoresist is removed. In step 10, a new photoresist layer 509 is coated, exposed and developed. In step 11, the sample is etched again, and the photoresist is removed. In step 12, a planarization layer 510 is coated on top.

Example Applications

Figure 6:
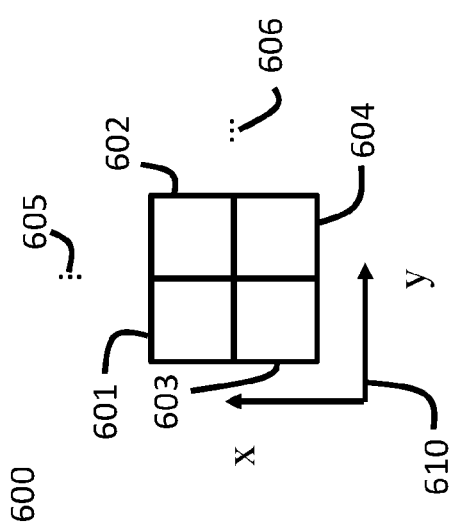
FIG. 6 illustrates a representative pixelized polarizer array.

One important application of patterned polarization filter is polarization camera. One class of polarization camera is the division-of-focal plane polarization camera. In this type of camera, the light sensitive detector is a sensor with an array of pixels and is used to measure a polarization image of a scene. A patterned polarization filter is placed on top of the array of pixels so that different pixel is sensitive to light of different polarization states. FIG. 6 shows a set of four pixels, 601, 602, 603 and 604, repeated in a square grid. The symbols 605 and 606 denote the repeating of the pixels along the axis defined by 610. In this design, the pixels are defined in a periodic array of square grid. In other designs, the pixels can be defined in periodic array of rectangular, hexagonal, octagonal or arbitrary forms. Alternatively, the pixels can be defined in a nonperiodic array. Each pixel represents a light detection unit with sensor element, circuitry to process and store the electrical signals, color and polarization filters, microlens, aperture to prevent crosstalk between pixels, antireflection coating and so forth. In other applications, these arrangements are used to produce spatially encoded polarized light such as polarization displays.

Representative Filters

Figure 7:
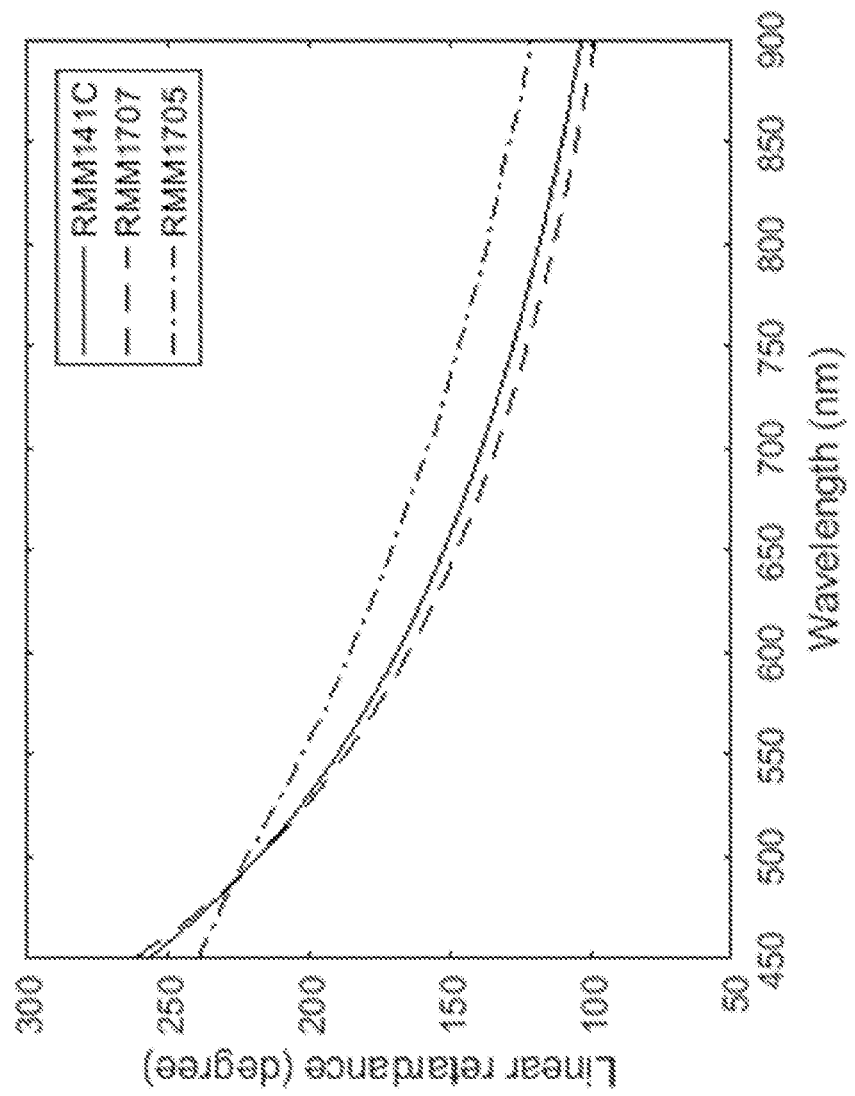
FIG. 7 illustrates linear retardance as a function of wavelength for several materials.

In the followings, four designs of polarization filters are disclosed which can be fabricated using techniques described in this disclosure, or by other techniques. The designs can be used to make achromatic polarization camera that operates at a wavelength band from 450 nm to 900 nm. The designs have an array of four repeating pixels as shown in FIG. 6. Pixels 601 and 602 do not have any LCP layer. The LCP layer is removed by the process described in FIG. 3. Pixels 603 and 604 have LCP layers. The thickness d of the LCP layer is defined by the retardance $\phi$ of the LCP layer by the relation:

$$\phi = \frac{2\pi \Delta n}{\lambda} d,$$

wherein $\lambda$ is a vacuum wavelength of light: $\Delta n$ is birefringence and is defined to be the refractive index difference between two eigenpolarizations propagating in the same direction in a birefringent material such as the LCP. In this case, $\Delta n = n_E - n_O$, where $n_E$ and $n_O$ are the extraordinary and ordinary indices. The retardance of a layer of LCP of uniform thickness is generally wavelength dependent. FIG. 7 shows the measured retardance of three types of LCP, RMM141C, RMM1707 and RMM1705, which are available from EMD Performance Materials, part of Merck KGaA, Darmstadt, Germany. In the following designs, a one-unit thickness denotes a layer of LCP that satisfies the following condition:

$$2\pi = 360° = \phi_{max} + \phi_{min}.$$

Here $\phi_{max}$ and $\phi_{min}$ are the maximum and minimum retardances of the LCP layer over the wavelength range of 450 nm to 900 nm. For example, in FIG. 7, the retardance curve of RMM1707 has a maximum retardance of 260 degrees at 450 nm and a minimum retardance of 100 degrees at 900 nm. This curve represents a sample of RMM1707 of one-unit thickness, since the sum of the maximum and minimum retardances is equal to 360 degrees. The physical thickness of the layer can range from 2 to 3 microns depending on the concentration of LCP, type of LCP and the processing conditions such as bake temperature.

It is instructive to define the Stokes vector and the Poincaré sphere. The polarization state of light can be described by the Stokes vector S, which consists of the four elements $S_0$, $S_1$, $S_2$, and $S_3$. $S_0$ represents the intensity of an optical field; $S_1$ and $S_2$ denote the affinity towards 0° and 45° linear polarization respectively; and $S_3$ expresses the difference between right and left circular polarizations. The Poincaré sphere is a graphical presentation of the Stokes vector $S_1$, $S_2$, and $S_3$. Each point on the Poincaré sphere represents a unique polarization state of light. In this description, the north and south poles represent right-hand circular (RCP) and left-hand circularly (LCP) polarized light respectively. All points on the equator of the Poincare sphere represent linear polarized light of different orientation angle. All points between the equator and the north pole represents right-hand elliptically polarized light (REP). All points between the equator and the south pole represents left-hand elliptically polarized light (LEP).

Example: Design 1

Design 1 is a representative pixelated polarizer suitable for an achromatic full Stokes polarization camera from 450 nm to 900 nm using two layers of different LCP materials and four wire grid polarizers at 0, 45, 90, 135 degrees. RMM1705 and RMM1707 are two liquid crystal polymers with low dispersive birefringence and high dispersive birefringence, respectively. When two layers of RMM1705 and RMM1707 are combined at their orthogonal fast-axis angle, their birefringence dispersion can compensate and results in a relatively flat retardance curve. The combination behaves as an achromatic linear retarder with little or no circular retardance.

Figure 8:
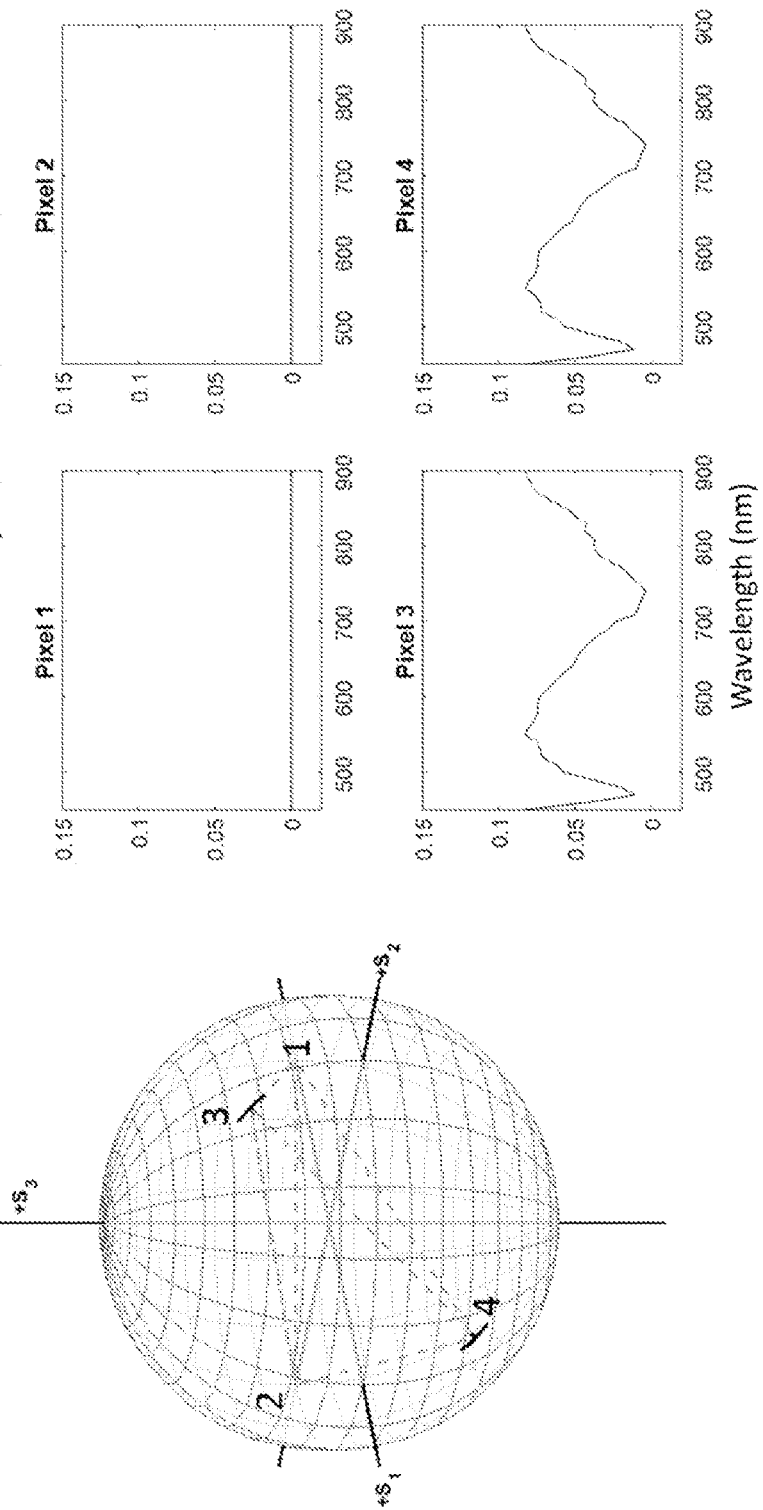
FIG. 8 includes graphs of analyzer vector variation for each of the pixels of Design 1 and their representation on the Poincaré sphere.

The design is made of four optical filters, denoted as pixel 1, 2, 3, and 4. Pixel 1 has a layer of wire grid polarizer at 90 degrees. Pixel 2 has a layer of wire grid polarizer at 135 degrees. Pixel 3 has a first layer of RMM1705 of 0.7627 thickness and 22.5 degrees orientation, a second layer of RMM1707 of 0.5499 thickness and 112.5 degrees orientation, and a third layer of wire grid polarizer at 45 degrees. Pixel 4 has a first layer of RMM1705 of 0.7627 thickness and 22.5 degrees orientation, a second layer of RMM1707 of 0.5499 thickness and 112.5 degrees orientation, and a third layer of wire grid polarizer at 0 degrees. Each pixel has a different optical filter that represents an achromatic elliptical polarizer. The design is summarized in the table below and in FIG. 8. Each of the four pixels has an eigenpolarization state represented on the Poincaré sphere. The deviation of the eigenpolarization state, i.e. the analyzer vector variation (AVV), is plotted as a function of wavelength. The maximum deviation of the analyzer vector variation for pixel 3 and 4 are 8.28%. One figure of merit for the design is the analyzer vector variation which represents the change in eigenpolarization as a function of wavelength. In general, small variation is good. Another figure of merit is the equally weighted variance (EWV) which provides a sense of how noise is propagate through the measurement process. For an array of four filters, the optimal and lowest EWV is equal to 10. For this design, the EWV is equal to 19.05. In general, there is a tradeoff between EWV and analyzer vector variation.

This design has an important and interesting property. The summation of the two eigenpolarizations at pixels 3 and 4 is the middle point of the two vertices on the Poincaré sphere. And this middle point always lies on a fixed point on the equatorial plane. This point does not depend on the retardance of the two LCP layers and is therefore achromatic. This point, along with pixels 1 and 2, which are another two achromatic wire grid polarizers lying on the equator, is enough to have an achromatic reconstruction of the linear polarization state of light. That is to say, this polarization camera design is perfectly achromatic for measurement of linear polarization state, but the achromaticity of circular polarization measurement suffers from the wavelength-dependent analyzer vector variation.

TABLE 1

|  |  | Pixel 1 | Pixel 2 | Pixel 3 | Pixel 4 |
|---|---|---|---|---|---|
| Layer 1 RMM1705 | Thickness | Etched |  | 0.7627 |  |
|  | Fast-axis angle (°) |  |  | 22.5 |  |
| Layer 2 RMM1707 | Thickness |  |  | 0.5499 |  |
|  | Fast-axis angle (°) |  |  | 112.5 |  |
| Wire grid polarizer transmissive angle (°) |  | 90 | 135 | 45 | 0 |
| Resultant analyzer vector variation |  | 0 | 0 | 8.28% | 8.28% |
| EWV |  |  | 19.05 |  |  |

Example: Design 2

Design 2 pertains to an achromatic full Stokes polarization camera from 450 nm to 900 nm using two layers of identical LCP material and four wire grid polarizers.

Figure 9:
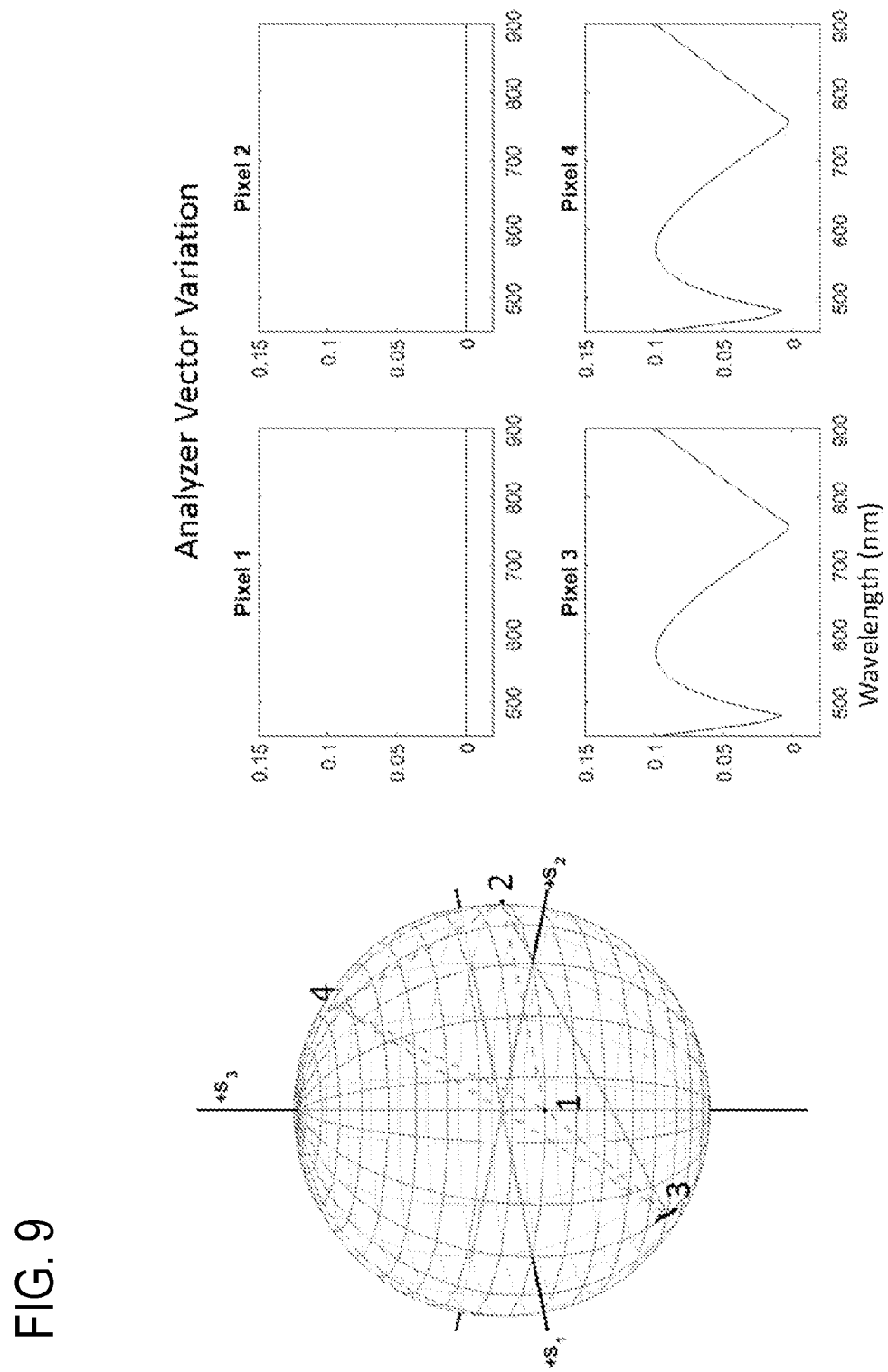
FIG. 9 includes graphs of analyzer vector variation for each of the pixels of Design 2 and their representation on the Poincaré sphere.

The design is made of four optical filters, denoted as pixel 1, 2, 3, and 4. Pixel 1 has a layer of wire grid polarizer at 22.5 degrees. Pixel 2 has a layer of wire grid polarizer at 67.5 degrees. Pixel 3 has a first layer of RMM141C of 0.4308 thickness and 6.38 degrees orientation, a second layer of RMM141C of unity thickness and 80.66 degrees orientation, and a third layer of wire grid polarizer at 0.98 degree. Pixel 4 has a first layer of RMM141C of 0.4308 thickness and 6.38 degrees orientation, a second layer of RMM141C of unity thickness and 80.66 degrees orientation, and a third layer of wire grid polarizer at −0.98 degrees. The design is summarized in the table below and in FIG. 9. The maximum deviation of the analyzer vector variation for pixel 3 and 4 are 9.91%. The EWV is equal to 19.05.

TABLE 2

| | | Pixel 1 | Pixel 2 | Pixel 3 | Pixel 4 |
|---|---|---|---|---|---|
| Layer 1 RMM141C | Thickness | Etched | | 0.4308 | |
| | Fast-axis angle (°) | | | 6.38 | |
| Layer 2 RMM141C | Thickness | | | 1 | |
| | Fast-axis angle (°) | | | 80.66 | |
| Wire grid polarizer transmissive angle (°) | | 22.5 | 67.5 | 0.98 | −0.98 |
| Resultant analyzer vector variation | | 0 | 0 | 9.91% | 9.91% |
| EWV | | | 22 | | |

Design 2 utilizes two layers of identical birefringent materials. The two-layer itself is not an achromatic retarder. It becomes an achromatic elliptical polarizer (or analyzer) only when combined with a linear polarizer at specific angle. Pixels 3 and 4 have two elliptical polarizers that are always orthogonal to each other. Thus, the summation of the two is the origin of the Poincaré sphere, which is independent of wavelength. This summation, along with pixels 1 and 2 which are two achromatic linear polarizers, provides an achromatic linear polarization measurement. This polarization camera design is perfectly achromatic on linear polarization measurement.

Example: Design 3

Design 3 pertains to an achromatic full Stokes polarization camera from 450 nm to 900 nm using two layers of different LCP materials and four wire grid polarizers.

The design is made of four optical filters, denoted as pixel 1, 2, 3, and 4. Pixel 1 has a layer of wire grid polarizer at 29.63 degrees. Pixel 2 has a layer of wire grid polarizer at −29.63 degrees. Pixel 3 has a first layer of RMM1705 of 0.7627 thickness and 0 degree orientation, a second layer of RMM1707 of 0.5499 thickness and 90 degrees orientation, and a third layer of wire grid polarizer at 119.63 degree. Pixel 4 has a first layer of RMM1705 of 0.7627 thickness and 0 degree orientation, a second layer of RMM1707 of 0.5477 thickness and 90 degrees orientation, and a third layer of wire grid polarizer at −119.63 degrees. The design is summarized in the table below and in FIG. 10. The maximum deviation of the analyzer vector variation for pixel 3 and 4 are 10.07%. The EWV is equal to 15.66.

TABLE 3

| | | Pixel 1 | Pixel 2 | Pixel 3 | Pixel 4 |
|---|---|---|---|---|---|
| Layer 1 RMM1705 | Thickness | Etched | | 0.7627 | |
| | Fast-axis angle (°) | | | 0 | |
| Layer 2 RMM1707 | Thickness | | | 0.5499 | |
| | Fast-axis angle (°) | | | 90 | |
| Wire grid polarizer transmissive angle (°) | | 29.63 | −29.63 | 119.63 | −119.63 |
| Resultant analyzer vector variation | | 0 | 0 | 10.07% | 10.07% |
| EWV | | | 15.66 | | |

This design is similar to design 1, except that the angles for the wire grid polarizer are changed to provide a smaller EWV, at a cost of a slightly higher analyzer vector variation. Like design 1, this polarization camera design is perfectly achromatic for measurement of linear polarization state.

Example: Design 4

Figure 11:
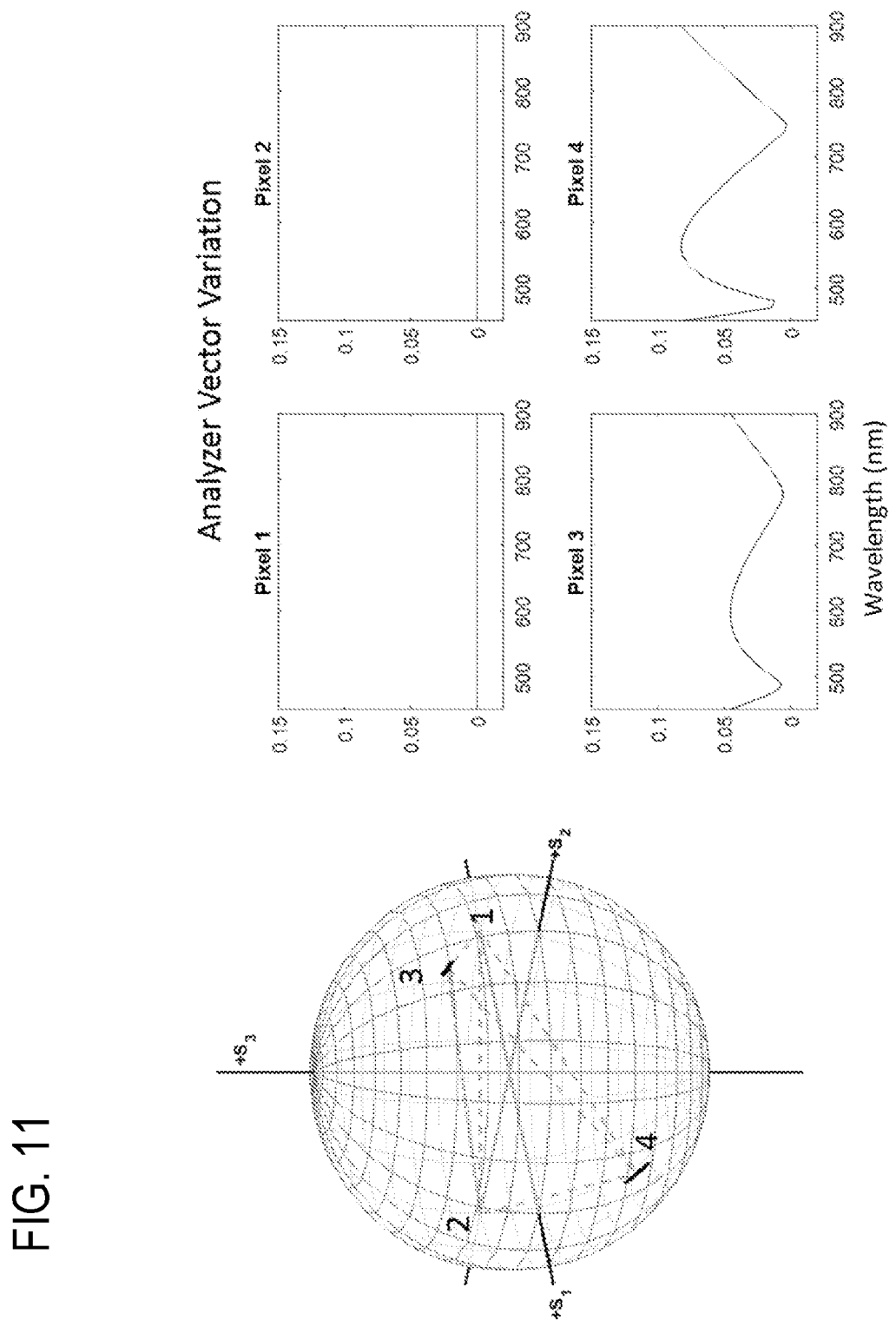
FIG. 11 includes graphs of analyzer vector variation for each of the pixels of Design 4 and their representation on the Poincaré sphere.

Design 4 pertains to an achromatic full Stokes polarization camera from 450 nm to 900 nm using three layers of identical LCP material and four wire grid polarizers at 0, 45, 90, 135 degrees. The design is made of four optical filters, denoted as pixel 1, 2, 3, and 4. Pixel 1 has a layer of wire grid polarizer at 90 degrees. Pixel 2 has a layer of wire grid polarizer at 135 degrees. Pixel 3 has a first layer of RMM141C of 0.5321 thickness and −14.05 degrees orientation, a second layer of RMM141C of unity thickness and 64.15 degrees orientation, a third layer of RMM141C of 0.5321 thickness and −14.05 degrees orientation and a fourth layer of wire grid polarizer at 45 degrees. Pixel 4 has a first layer of RMM141C of 0.5321 thickness and −14.05 degrees orientation, a second layer of RMM141C of unity thickness and 64.15 degrees orientation, a third layer of RMM141C of 0.5321 thickness and −14.05 degrees orientation and a fourth layer of wire grid polarizer at 0 degree. The design is summarized in the table below and in FIG. 11. The maximum deviation of the analyzer vector variation for pixel 3 and 4 are 4.54% and 8.24% respectively. The EWV is equal to 19.97.

TABLE 4

| | | Pixel 1 | Pixel 2 | Pixel 3 | Pixel 4 |
|---|---|---|---|---|---|
| Layer 1 RMM141C | Thickness | Etched | | 0.5321 | |
| | Fast-axis angle (°) | | | −14.05 | |
| Layer 2 RMM141C | Thickness | | | 1 | |
| | Fast-axis angle (°) | | | 64.15 | |
| Layer 3 RMM141C | Thickness | | | 0.5321 | |
| | Fast-axis angle (°) | | | −14.05 | |
| Wire grid polarizer transmissive angle (°) | | 90 | 135 | 45 | 0 |
| Resultant analyzer vector variation | | 0 | 0 | 4.54% | 8.24% |
| EWV | | | 19.97 | | |

Unlike the previous designs, this design utilizes three layers of identical LCP. The three-layer itself acts as an achromatic linear retarder, but with some circular retardance.

In conclusion, several designs for achromatic polarization filters and method to fabricate the design are described in this document. The designs can be applied to the construction of full Stokes polarization camera and full Stokes polarization display.

Additional Patterned Polarizer Examples

Figure 12:
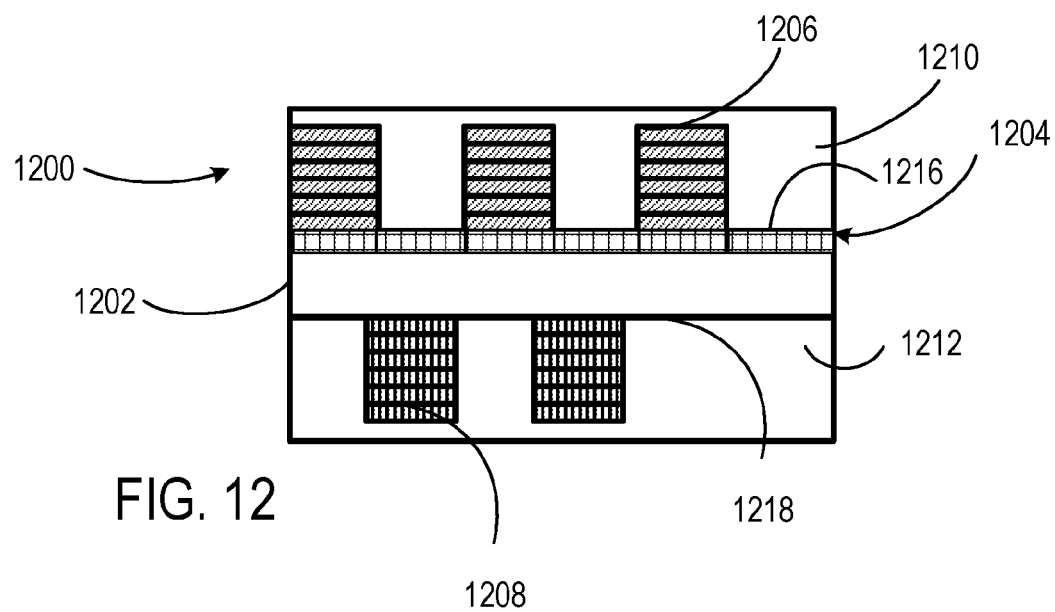

FIG. 12 illustrates a patterned polarizer 1200 that includes polarizer layer stacks 1206 and 1208 on respective surfaces 1212, 1218 of a substrate 1202 that includes a patterned wire grid polarizer 1204. Respective planarization layers 1210, 1212 are situated over the polarizer layer stacks 1206, 1208, respectively.

Figure 13:
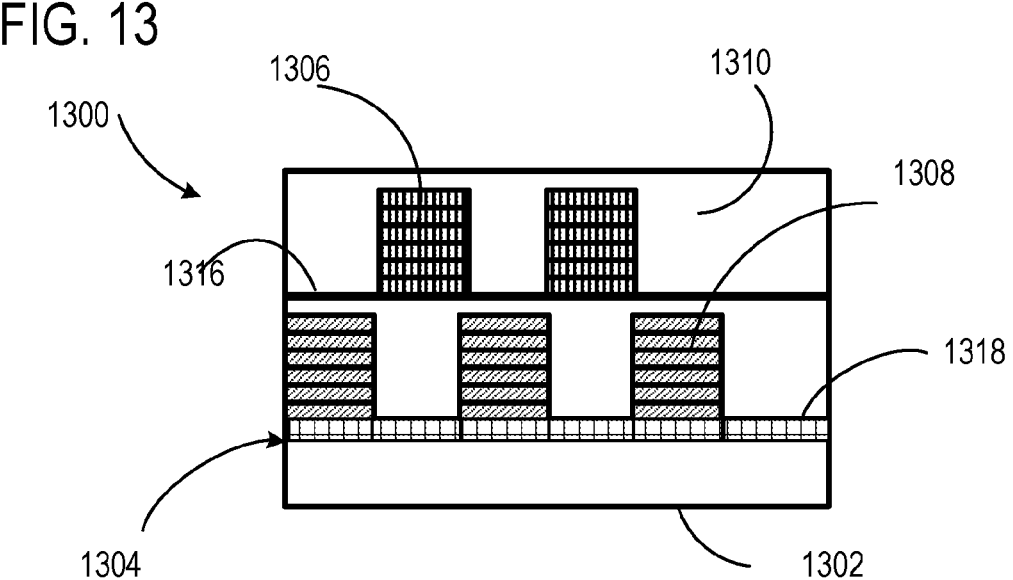
FIGS. 12-13 illustrate additional examples of pixeled polarizers.

FIG. 13 illustrates a patterned polarizer 1300 that includes polarizer layer stacks 1306 and 1308 on a surface 1316 of a planarization layer 1310 and a surface 1318 of a substrate 1302 that includes a patterned wire grid polarizer 1304. A planarization layer 1310 is situated over the polarizer layer stacks such as the stack 1306.

Representative Method

Figure 14:
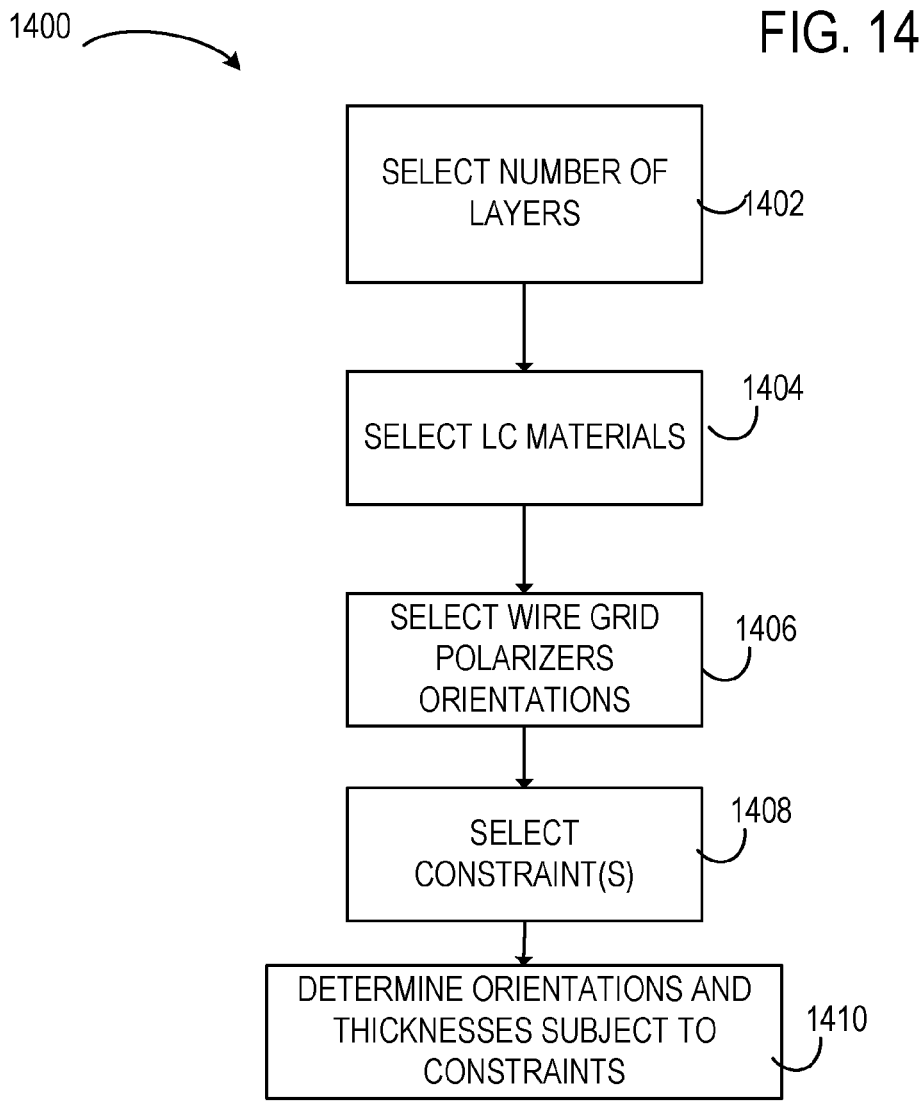
FIG. 14 illustrates a method of polarizer design.

FIG. 14 illustrates a representative method 1400 of designing a pattern polarizer. At 1402, a number or layers is selected and at 1404, LC materials are selected. At 1406, wire grid polarizer orientations are selected and at 1408, one or more constraints such as values of AVV or EWV are selected. At 1410, orientations and thicknesses are selected based on the constraints. In some cases, the number of layers is limited to 2 or 3 to simplify construction and avoid problems associated with thick retarders. In addition, wire grid polarizer orientations can be selected to correspond to commercially available parts, or allowed to vary.

Computation and Control Environment

Figure 15:
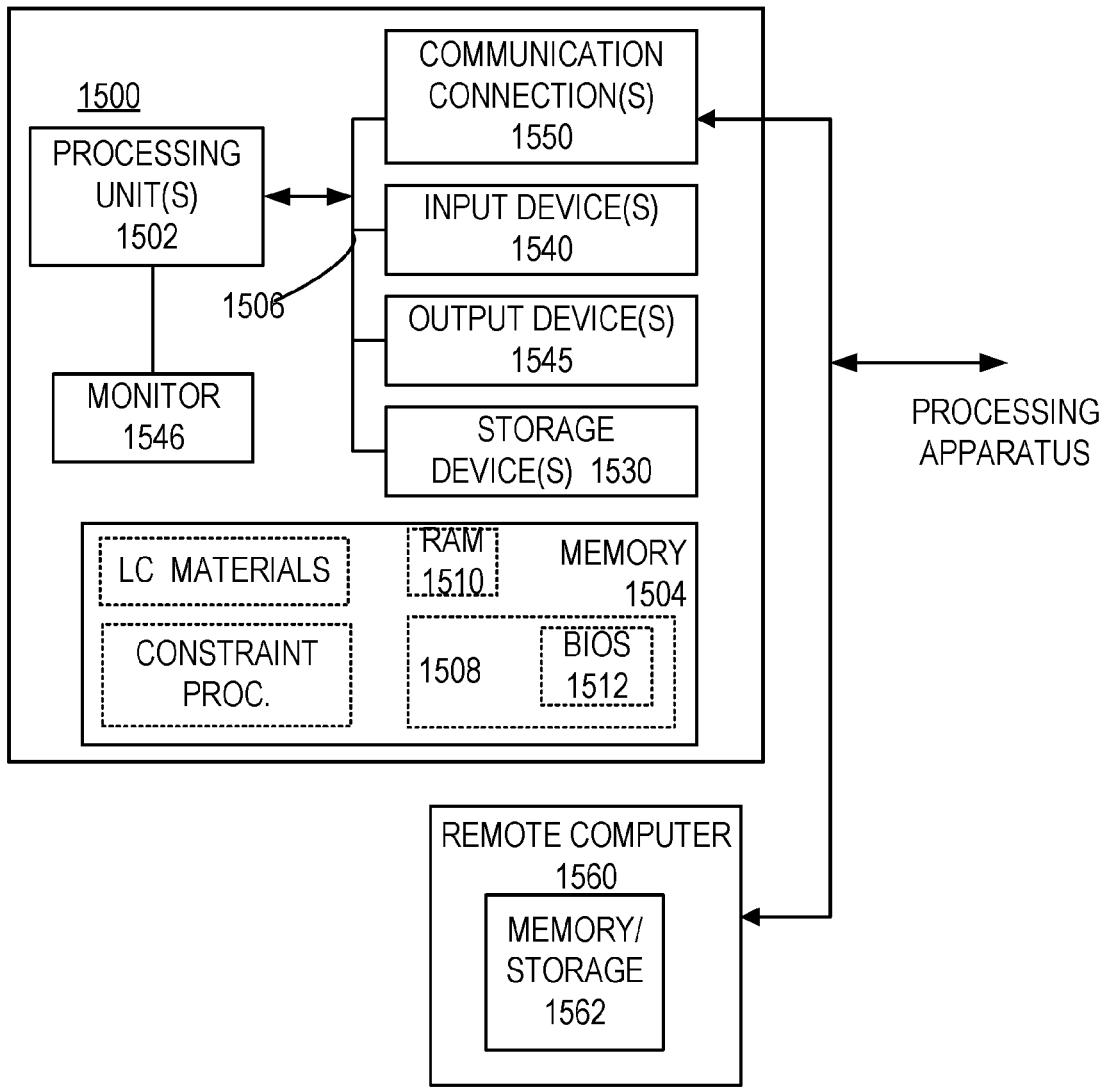
FIG. 15 illustrates a representative computing environment for any of the methods disclosed herein.

FIG. 15 and the following discussion are intended to provide a brief, general description of an exemplary computing environment in which the disclosed technology may be implemented. Although not required, the disclosed technology is described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 15, an exemplary system for implementing the disclosed technology includes a general purpose computing device in the form of an exemplary conventional PC 1500, including one or more processing units 1502, a system memory 1504, and a system bus 1506 that couples various system components including the system memory 1504 to the one or more processing units 1502. The system bus 1506 may be any of several types of bus structures including a memory bus or memory controller, a peripheral bus, and a local bus using any of a variety of bus architectures. The exemplary system memory 1504 includes read only memory (ROM) 1508 and random access memory (RAM) 1510. A basic input/output system (BIOS) 1512, containing the basic routines that help with the transfer of information between elements within the PC 1500, is stored in ROM 1508. The memory 1505 can store LC material properties, processor-executable instructions for producing filters subject to constraints such as AVV and EWV.

The exemplary PC 1500 further includes one or more storage devices 1530 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1506 by a hard disk drive interface, a magnetic disk drive interface, and an optical drive interface, respectively. The drives and their associated computer-readable media provide nonvolatile storage of computer-readable instructions, data structures, program modules, and other data for the PC 1500. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 1530 including an operating system, one or more application programs, other program modules, and program data. A user may enter commands and information into the PC 1500 through one or more input devices 1540 such as a keyboard and a pointing device such as a mouse. Other input devices may include a digital camera, microphone, joystick, game pad, satellite dish, scanner, or the like. These and other input devices are often connected to the one or more processing units 1502 through a serial port interface that is coupled to the system bus 1506, but may be connected by other interfaces such as a parallel port, game port, or universal serial bus (USB). A monitor 1546 or other type of display device is also connected to the system bus 1506 via an interface, such as a video adapter. Other peripheral output devices, such as speakers and printers (not shown), may be included.

The PC 1500 may operate in a networked environment using logical connections to one or more remote computers, such as a remote computer 1560. In some examples, one or more network or communication connections 1550 are included. The remote computer 1560 may be another PC, a server, a router, a network PC, or a peer device or other common network node, and typically includes many or all of the elements described above relative to the PC 1500, although only a memory storage device 1562 has been illustrated in FIG. 15. The personal computer 1500 and/or the remote computer 1560 can be connected to a logical a local area network (LAN) and a wide area network (WAN). Such networking environments are commonplace in offices, enterprise-wide computer networks, intranets, and the Internet.

When used in a LAN networking environment, the PC 1500 is connected to the LAN through a network interface. When used in a WAN networking environment, the PC 1500 typically includes a modem or other means for establishing communications over the WAN, such as the Internet. In a networked environment, program modules depicted relative to the personal computer 1500, or portions thereof, may be stored in the remote memory storage device or other locations on the LAN or WAN. The network connections shown are exemplary, and other means of establishing a communications link between the computers may be used.

Additional Examples

Figure 16:
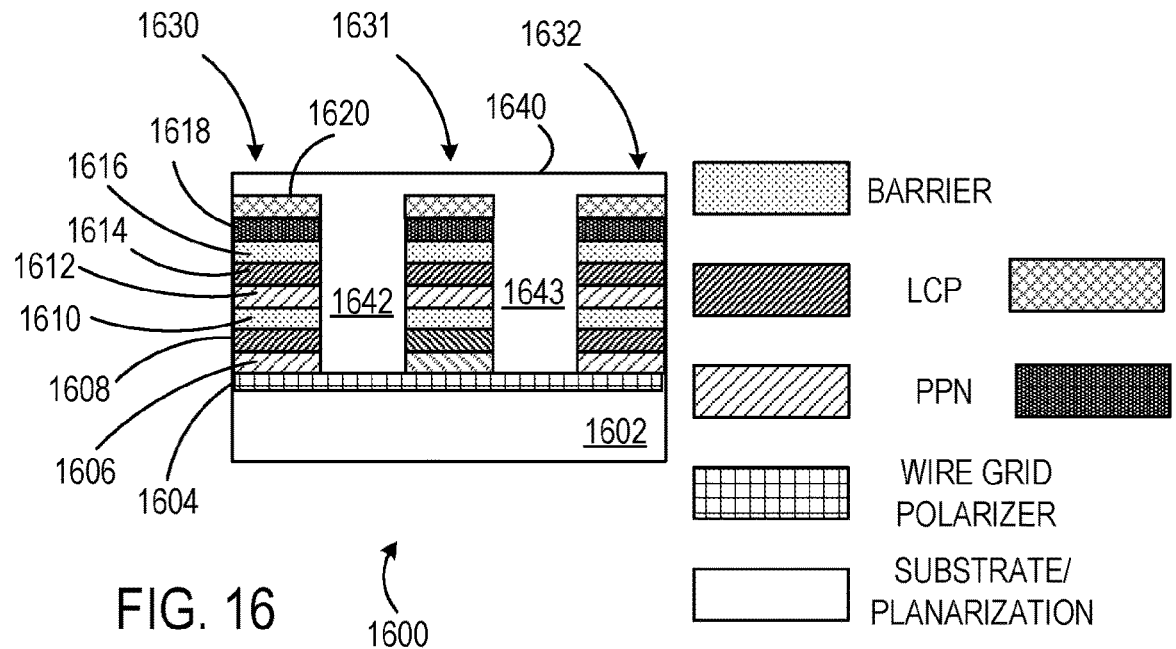
FIGS. 16-17 illustrate additional examples of pixelated polarizers.

Referring to FIG. 16, a representative pixelated optical device 1600 includes pixel layer stacks 1630-1632 that can include the same or different numbers and combinations of LCP, PPN, polarizer, filter, and barrier layers. Layers of the same composition can have the same or different alignments and can be situated in different locations in the stacks. The stacks 1630-1632 can have different numbers of layers and can be covered with a planarization material 1640. Gaps 1642, 1643 are shown as filled with the planarization material 1640 but can be or includes additional pixel layer stacks that are the same or different. In the example of FIG. 16, layers 1606, 1612, 1618 are PPN layers, layers 1608, 1614, 1620 are LCP layers, and layers 1610, 1616 are barrier layers. Layer 1604 is a polarizer layer such as wire grid or other polarizer situated on a substrate 1602. The pixel layer stacks 1631, 1632 can be the same or different. Transition regions dimensions can be controlled as discussed above to be less that ¼, ⅕, 1/10, 1/20 or less of total stack thickness or thickness of a selected layer.

Figure 17:
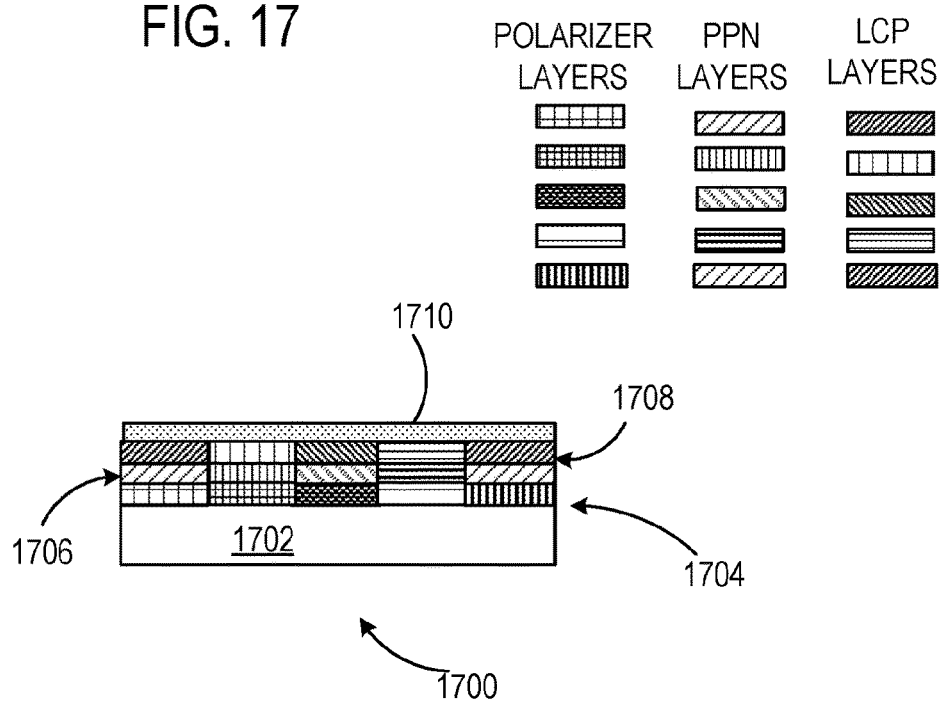

In an example 1700 shown in FIG. 17, a layer 1706 of different PPN pixel elements (differing in one or more of material and/or alignment) is provided on a polarizer element layer 1704 situated on a substrate 1702. A layer of different LCP pixel elements 1708 (differing in one or more of material and/or alignment) is situated on the layer 1706. In this example 5 pixel elements combinations (i.e., combinations of polarizer, PPN and an LCP) are shown. Edges of each of the pixel elements can be controlled to provide small transition regions as discussed above.

General Considerations

As used in this application and in the claims, the singular forms "a," "an," and "the" include the plural forms unless the context clearly dictates otherwise. Additionally, the term "includes" means "comprises." Further, the term "coupled" does not necessarily exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation. Some layers are referred to as being "on" other layers, but in some cases, contact is not required. Transition regions at pixel edges are referred to as reduced or narrow if less than 24%, 20%, 15%, 10%, 7.5%, 5%, 2%, or 1% of layer thickness. The examples are described as transmissive filters but reflective materials and devices can be provided.

Specific thicknesses and orientations are used in examples, but these can vary by 10%, 5%, 2.5%, 1% in some examples. Thicknesses can also be referred to as waves with reference to a particular wavelength, typically based on a product of physical thickness and birefringence. Angular orientations are generally with respect to an arbitrary reference axis as is customary.

In view of the many possible embodiments to which the principles of the disclosed technology may be applied, it should be recognized that the illustrated embodiments are only preferred examples and should not be taken as limiting in scope. We therefore claim all that comes within the scope and spirit of the appended claims.

We claim:

1. A method of fabricating a patterned polarizing filter, comprising:
   forming a first alignment layer on a substrate;
   depositing a first liquid crystal layer on the first alignment layer to form a first aligned liquid crystal polymer (LCP) layer;
   forming a barrier layer on the first aligned LCP layer;
   forming a second alignment layer on the barrier layer;
   depositing a second liquid crystal layer on the second alignment layer to form a second aligned LCP layer; and
   directionally etching the first aligned LCP layer and the second aligned LCP layer to produce a plurality of filter pixels, wherein at least a first one of the plurality of filter pixels includes a first portion of the first aligned LCP layer and a first portion of the second LCP layer and at least a second one pixel of the plurality of filter pixels includes a second portion of the first aligned LCP layer.

2. The method of claim 1, wherein at least a third one of the plurality of filter pixels is directionally etched to remove the first aligned LCP layer and the second aligned LCP layer and the directional etch is a plasma etch.

3. The method of claim 1, further comprising depositing and patterning a mask layer, and defining the plurality of filter pixels by directionally etching through the mask layer.

4. The method of claim 1, wherein the substrate includes a plurality of wire grid polarizer pixels situated to correspond to respective filter pixels defined by the directional etching and the substrate includes an array of sensor pixels situated to correspond to the plurality of wire grid polarizer pixels.

5. The method of claim 1, further comprising forming a planarization layer over the directionally etched first aligned LCP layer.

6. The method of claim 1, further comprising:
forming a first planarization layer on the first one of the plurality of filter pixels and the second one of the plurality of filter pixels; and
directionally etching the first and second LCP layers to form a third one of the plurality of filter pixels.

7. The method of claim 6, further comprising forming a second planarization layer on the first planarization layer and the third one of the plurality of filter pixels and the first aligned LCP layer and the second aligned LCP layer are formed of different LCPs.

8. The method of claim 6, the plurality of filter pixels are formed on a major surface of the substrate, wherein at least the first one of the plurality of filter pixels has a transition region extending parallel to the major surface a distance that is less than $1/10$ of a thickness of the pixels of the plurality of filter pixels.

9. A pixelated polarizer, comprising:
a first plurality of pixels defined by a first liquid crystal polymer (LCP) and a first alignment layer having a first alignment;
a second plurality of pixels defined by the first LCP and the first alignment layer and a second LCP and a second alignment layer have a second alignment that is different from the first alignment;
and a third plurality of pixels lacking the first and second LCP and alignment layers.

10. The pixelated polarizer of claim 9, further comprising a planarization layer situated on the first, second, and third plurality of pixels.

11. The pixelated polarizer of claim 9, wherein transitions regions between the pixels of the first plurality of pixels and the pixels of the third plurality of pixels have widths that are less than $1/10$ of a thickness of the pixels of the first plurality of pixels and the pixels of the third plurality of pixels.

12. A sensor, comprising:
a plurality of sensor elements;
a substrate having a plurality of substrate polarizer pixels corresponding to one of the plurality of sensor elements, the plurality of substrate polarizer pixels including substrate polarizer pixels having at least two orientations; and
the pixelated polarizer of claim 9, situated so that the first, second, third pluralities of pixels and the plurality of substrate polarizer pixels are aligned.

13. A polarization display, comprising:
a plurality of light emitter elements;
a substrate having a plurality of substrate polarizer pixels corresponding to the plurality of light emitter elements, the plurality of substrate polarizer pixels including substrate polarizer pixels having at least two orientations; and
the pixelated polarizer of claim 9, situated so that the first, second, third pluralities of pixels and the plurality of light emitter elements are aligned.

14. The pixelated polarizer of claim 9, further comprising a barrier layer situated between the first LCP layer and the second LCP layer.

15. The pixelated polarizer of claim 9, further wherein a width of a transition region between the first pixels and the second pixels is less than $1/10$ of a thickness of either of the first LCP layer and the second LCP layer.

16. The pixelated polarizer of claim 9, wherein the first, second, and third pluralities of polarizer pixels are selected to produce an achromatic linear retarder.

* * * * *